UNITED STATES PATENT OFFICE 2,170,163

WATERPROOF PAINT

Claude V. Smith, Emporia, Kans.

No Drawing. Application July 22, 1937,
Serial No. 155,093

2 Claims. (Cl. 134—46)

This invention relates to a waterproof paint or coating primarily for use on porous hard material such as stucco, cement, stone, tile and brick, and to a composition of matter not only constituting the main materials of the paint, but also capable of use in filling cracks, and in the mixing of cement or stucco.

In carrying out the invention, calcium chloride three parts, commercial lye one part and water sixteen parts are thoroughly mixed and sealed airtight in containers, since the material will harden if exposed to the air. This constitutes the base mixture.

In order to mix paint, one-half pint of said base mixture is added to seven and one-half pounds of Portland cement and five pints of water and thoroughly admixed, making one gallon of white waterproof paint.

If desired, the paint or base material may be suitably colored by the addition of any straight cement color.

The said paint when applied to stone, stucco, tile, brick, cement or the like, soaks into the same, hardens and forms a coat impervious to the passage of water therethrough and in fact it adheres so effectively that it cannot be removed without removing a part of the surface to which it has been applied.

The paint will also withstand ordinary water pressures caused by seepage and hence may be used to fill cracks in cement walls and the like to prevent seepage of water therethrough. The paint is also alkali proof and will withstand the heat of the sun.

The aforesaid base mixture may also be used in any desired proportion in the mixing of cement or stucco in order to render the cement or stucco waterproof and of greater strength, because the hardening will be accelerated which will give greater crystallization.

When the paint is applied to old stucco in a cracked condition, it imparts a smooth finished coat thereto, renewing the strength of the old stucco by soaking into the same and hardening.

When coloring is added to the paint, it is ideal for application to cement floors since it is much harder and tougher than ordinary lead paints and will withstand wear longer.

Various changes may be resorted to provided they fall within the spirit and scope of the invention.

I claim as my invention:

1. An aqueous mixture of calcium chloride three parts, lye one part, and seven and one-half pounds of Portland cement.

2. A waterproofing material for use as a paint and as a hardening agent capable of withstanding pressure of water when dry, the material consisting of calcium chloride three parts, lye one part, Portland cement seven and one-half pounds, and water.

CLAUDE V. SMITH.